US007526462B2

(12) United States Patent
Sakurai et al.

(10) Patent No.: US 7,526,462 B2
(45) Date of Patent: Apr. 28, 2009

(54) METHOD AND APPARATUS FOR GENERATING TIME-SERIES DATA FROM WEB PAGES

(75) Inventors: Shigeaki Sakurai, Tokyo (JP); Norihiko Sawa, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 477 days.

(21) Appl. No.: 11/376,876

(22) Filed: Mar. 16, 2006

(65) Prior Publication Data

US 2006/0271533 A1 Nov. 30, 2006

(30) Foreign Application Priority Data

May 26, 2005 (JP) ............................. 2005-153975

(51) Int. Cl.
*G06E 1/00* (2006.01)
(52) U.S. Cl. ............................................ 706/20; 707/6
(58) Field of Classification Search ................... 706/20; 707/6
See application file for complete search history.

(56) References Cited

U.S. PATENT DOCUMENTS

| 5,963,965 | A | * | 10/1999 | Vogel ........................... 715/236 |
| 6,076,088 | A | * | 6/2000 | Paik et al. ....................... 707/5 |
| 6,338,057 | B1 | * | 1/2002 | Weeks ............................ 707/3 |
| 6,446,061 | B1 | * | 9/2002 | Doerre et al. ................... 707/3 |
| 6,654,742 | B1 | * | 11/2003 | Kobayashi et al. ............. 707/7 |
| 6,742,003 | B2 | * | 5/2004 | Heckerman et al. ...... 707/104.1 |
| 6,944,612 | B2 | * | 9/2005 | Roustant et al. ................. 707/3 |
| 7,024,404 | B1 | * | 4/2006 | Gerasoulis et al. ............. 707/3 |
| 2002/0052928 | A1 | * | 5/2002 | Stern et al. ................... 709/218 |
| 2003/0195877 | A1 | * | 10/2003 | Ford et al. ...................... 707/3 |
| 2003/0195883 | A1 | * | 10/2003 | Mojsilovic et al. ............. 707/6 |
| 2004/0064442 | A1 | * | 4/2004 | Popovitch ....................... 707/3 |
| 2005/0114317 | A1 | * | 5/2005 | Bhide et al. .................... 707/3 |

FOREIGN PATENT DOCUMENTS

| JP | 2002-297883 | 10/2002 |
| JP | 2003-242165 | 8/2003 |
| JP | 2004-078512 | 3/2004 |
| JP | 2004-139376 | 5/2004 |
| JP | 2004-185572 | 7/2004 |
| JP | 2004-302809 | 10/2004 |

* cited by examiner

*Primary Examiner*—David R Vincent
*Assistant Examiner*—Mai T Tran
(74) *Attorney, Agent, or Firm*—Blakely, Sokoloff, Taylor & Zafman LLP

(57) ABSTRACT

According to one embodiment, the Web pages that match a user's designated collection condition are collected from a plurality of Web sites. The collected Web pages are divided into a plurality of clusters, based on URL information of the Web pages. A date expression is extracted from Web pages included in each of the clusters. A typical date expression form is determined for each of the clusters, based on the extracted date expression. The Web pages included in each of the clusters are divided into a plurality of items, based on the date expression form. The items are sorted for each of the clusters in order of time, based on date expressions corresponding to the items. Time-series data is generated for each of the clusters by sorting the items.

10 Claims, 9 Drawing Sheets

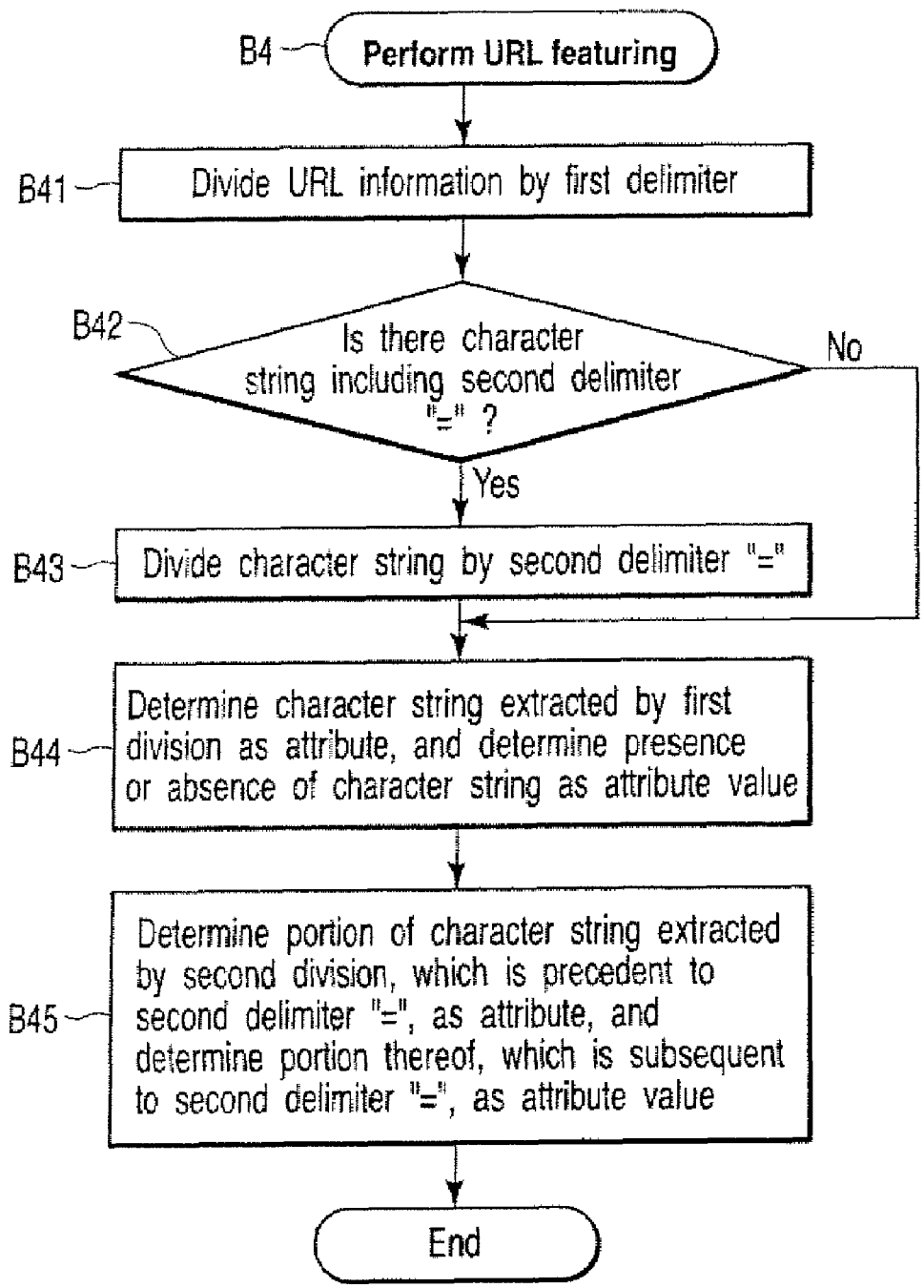
F I G. 3

| ID | Devided character string | | | | | | |
|---|---|---|---|---|---|---|---|
| t1 | http: | www.xxx.xx.xx | forums | message | start=860 | cid=24 | tid=317264 |

| ID | http: | www.xxx.xx.xx | forums | message | start | cid | tid |
|---|---|---|---|---|---|---|---|
| t1 | Presence | Presence | Presence | Presence | 860 | 24 | 317264 |

FIG. 7

| ID | http: | www.xxx.xx.xx | forums | message | start | cid | tid |
|---|---|---|---|---|---|---|---|
| t2 | Presence | Presence | Presence | Presence | 20 | 24 | 412562 |

FIG. 8

| ID | http: | www.yyy.yy.yy | content | topic | 13841 | cid |
|---|---|---|---|---|---|---|
| t3 | Presence | Presence | Presence | Presence | Presence | 0 |

FIG. 9

| ID | http: | www.xxx.xx.xx | forums | message | start | cid | tid | www.yyy.yy.yy | content | topic | 13841 | cid |
|---|---|---|---|---|---|---|---|---|---|---|---|---|
| t1 | Presence | Presence | Presence | Presence | 860 | 24 | 317264 | Absence | Absence | Absence | Absence | - |
| t2 | Presence | Presence | Presence | Presence | 20 | 24 | 412562 | Absence | Absence | Absence | Absence | - |
| t3 | Absence | Absence | Absence | Absence | - | - | - | Presence | Presence | Presence | Presence | 0 |

F I G. 10

| ID | Date expression form |
|---|---|
| d1 | YYYY / MM / DD |
| d2 | CCC / MM / YYYY |
| d3 | MM / DD,YYYY |

FIG. 11

| | http: / / www.xxx.xx.xx / forums / message?start=860 & cid=24 & tid=317264 | |
|---|---|---|
| | Bulletin board | |
| Mr.A | Date Jun / 02 / 2004<br>I bought a PC card.<br>The card is excellent. | i1 |
| Mr.B | Date Jun / 03 / 2004<br>I also bought the PC card.<br>But, the card is not good in my computer environment. | i2 |
| Mr.C | Date Jun / 03 / 2004<br>I also use the card. The card is good for my computer environment.<br>What your environment are composed of ? | i3 |
| Mr.B | Date Jun / 03 / 2004<br>I use the laptop computer made in XXX company. The computer is installed some software. | i4 |
| Mr.E | Date Jun / 03 / 2004<br>I also the same computer and the same card. However, in my computer, the card is running. | i5 |

FIG. 12

| Word | tf-idf |
|---|---|
| complaint | 0.30 |
| memory | 0.20 |
| computer | 0.15 |
| ⋮ | ⋮ |
| phone | 0.10 |
| glad | 0.09 |
| ⋮ | ⋮ |
| the | 0.02 |
| ⋮ | ⋮ |

FIG. 13

| Word | Appearance ratio |
|---|---|
| complaint | 0.10 |
| memory | 0.12 |
| computer | 0.09 |
| ⋮ | ⋮ |
| phone | 0.04 |
| glad | 0.04 |
| ⋮ | ⋮ |
| the | 0.05 |
| ⋮ | ⋮ |

| ID | complaint | memory | computer | ⋯ | phone |
|---|---|---|---|---|---|
| c1 | 0.10 | 0.12 | 0.09 | ⋯ | 0.04 |
| c2 | 0.07 | 0.08 | 0.05 | ⋯ | 0.01 |
| c3 | 0.09 | 0.11 | 0.10 | ⋯ | 0.05 |
| ⋯ | | | | | |

FIG. 16

| ID | complaint | memory | computer | ⋯ | phone |
|---|---|---|---|---|---|
| c4 | 0.095 | 0.115 | 0.095 | ⋯ | 0.045 |
| c2 | 0.070 | 0.080 | 0.050 | ⋯ | 0.010 |
| ⋯ | | | | | |

METHOD AND APPARATUS FOR GENERATING TIME-SERIES DATA FROM WEB PAGES

CROSS-REFERENCE TO RELATED APPLICATIONS

This application is based upon and claims the benefit of priority from Japanese Patent Application No. 2005-153975, filed May 26, 2005, the entire contents of which are incorporated herein by reference.

BACKGROUND

1. Field

One embodiment of the invention relates to a method and apparatus, for example, favorable for collecting Web pages that match a user's designated search condition and generating time-series data, which is divided into clusters, from the Web pages.

2. Description of the Related Art

An information processing apparatus such as a personal computer generally has a Web browser. A Web browser is used to browse Web pages that are public on the Internet by way of a Web server. Recent information processing apparatuses are able to start a search engine from a Web browser according to a user's operation. The search engine receives a user's designated keyword (search condition) and collects a set of Web pages associated with (conforming to) the keyword. The search engine simply collects Web pages on the basis of the degree of association with the user's designated keyword. In other words, the search engine cannot collect Web pages in view of the degree of time association between the Web pages or arrange the Web pages associated with each other.

Jpn. Pat. Appln. KOKAI Publication No. 2002-297883 (referred to as document 1 hereinafter) discloses a knowledge information management apparatus for storing conversation streams of business operations which are exchanged among the traders concerned through a network. This apparatus also stores objects necessary for carrying out the business operations in a process from the occurrence of a problem to the solution of the problem. The apparatus associates any one of the stored conversation streams and any one of the objects with each other. With this association, the apparatus can output information about the conversation stream and the object associated with each other.

The knowledge information management apparatus disclosed in document 1 collects specific conversation streams. To do so, an area from which the conversation streams are output needs to be specified in advance. When a conversation stream is not explicit, the apparatus cannot collect it.

Jpn. Pat. Appln. KOKAI Publication No. 2004-139376 (referred to as document 2 hereinafter) discloses a technique of monitoring a word-of-mouth site and analyzing the frequency with which a specified word-of-mouth is used at the word-of-mouth site. The fluctuations in the frequency during a specified time period of a notable event are analyzed. However, the technique disclosed in document 2 makes it impossible to know the degree of association in which the progression of a plurality of notable events over time is considered.

Jpn. Pat. Appln. KOKAI Publication No. 2004-185572 (referred to as document 3 hereinafter) discloses a word-of-mouth information analysis apparatus for extracting user information, time information and sentence information from collected sentences for each of articles. This apparatus can divide sentence information into words and combine these words with the user information and time information into data. In document 3, however, the time information is simply used as one value that features an article. It is thus impossible to understand the degree of association of articles in which the progression of the articles over time is considered.

Jpn. Pat. Appln. KOKAI Publication No. 2003-242165 (referred to as document 4 hereinafter) discloses a potential target extraction apparatus. The extraction apparatus acquires a time-series pattern having effective customer characteristics in consideration of time-series customer data in the field of communication service and the like. The extraction apparatus divides a plurality of quantitative attributes, which make up time-series data (customer data), into some sets of attributes in advance. The extraction apparatus performs clustering for the sets of attributes (i.e., attribute values of elements that make up time-series data). Quantitative time-series data is therefore converted into qualitative time-series data that is featured by clustering. The extraction apparatus classifies the qualitative time-series data into data (subscriber data) of subscribers for a specific service and data of nonsubscribers (nonsubscriber data). The apparatus extracts a pattern having a time-series characteristic of a specific set of attributes from the subscriber data. The apparatus extracts time-series data of nonsubscribers, which is similar to the extracted pattern, from the nonsubscriber data and determines the nonsubscribers (customers) as potential customers.

As the Internet becomes widespread, a number of topics are developed on, for example, a bulletin board of the Web day to day. Most of the topics are insignificant. Even though nobody notices a topic on the bulletin board, it is not so important to specific persons or organizations. However, some of the topics may cause a disadvantage to an individual and an organization and cause them to miss an opportunity to make a profit.

No notification about the above topics is always made to their related persons or organizations. The sites of the topics are not limited to a specific bulletin board. These topics vary from specific person to specific person or from specific organization to specific organization. On the other hand, a large number of topics are developed on a number of bulletin boards. It is therefore very difficult to check all of the topics and determine whether the topics are advantageous to specific persons and organizations.

It is thus required that data items including user's notable topics be collected from a plurality of sites scattered on the Web and their related data items be sorted in consideration of a lapse of time. However, none of documents 1 to 3 teach obtaining the degree of association in which the progression of a plurality of notable topics (events) over time is considered.

Document 4 discloses a technique of extracting a pattern having a time-series characteristic of a specific set of attributes from the results of clustering for customer data (i.e., time-series data made up of a plurality of quantitative attributes) in the field of communication service and the like. In document 4, clusters are generated by clustering for attribute values of elements that make up time-series data.

The type, number or location of attribute values included in the Web data collected from a plurality of sites (Web sites) scattered on the Web is not fixed, unlike those of attribute values included in the customer data. Clustering as disclosed in document 4 is difficult to perform for the attribute values of the Web data. In document 4, one qualitative time-series data item is generated from one quantitative time-series data item. In this generation, data items (topics) associated with data including user's notable topics collected from a plurality of Web sites are difficult to sort in consideration of the progression of the data items (topics) over time.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary flowchart of a procedure performed in block B4 in the flowchart shown in FIG. 2;

FIG. 7 is a diagram showing an example of a URL feature according to the embodiment;

FIG. 8 is a diagram showing another example of the URL feature according to the embodiment;

FIG. 9 is a diagram showing still another example of the URL feature according to the embodiment;

FIG. 10 is a diagram showing an example of URL feature vectors generated from the URL features shown in FIGS. 7 to 9;

FIG. 11 is a diagram showing an example of date expression forms previously stored in a date expression area according to the embodiment;

FIG. 12 is a diagram of items into which the Web page shown in FIG. 5 is divided;

FIG. 13 is a diagram showing an example of a tf-idf value of each of words included in first cluster according to the embodiment;

FIG. 14 is a diagram showing an example of an appearance ratio of each of the words included in first cluster according to the embodiment;

FIG. 15 is a diagram showing an example of text feature vectors generated for first, second and third clusters according to the embodiment; and FIG. 16 is a diagram showing an example of text feature vectors for each of clusters into which first and third clusters are integrated in the embodiment.

DETAILED DESCRIPTION

Various embodiments according to the invention will be described hereinafter with reference to the accompanying drawings. In general, according to one embodiment of the invention, there is provided a method of generating time-series data from Web pages. The method comprises collecting Web pages, which match a user's designated collection condition, from a plurality of Web sites, the collecting including storing the collected Web pages in a storage device, dividing a set of Web pages stored in the storage device into a plurality of clusters, based on URL information of the Web pages, extracting a date expression from Web pages included in each of the clusters, determining a typical date expression form for each of the clusters, based on the extracted date expression, dividing the Web pages included in each of the clusters into a plurality of items with reference to a location where a date expression of the date expression form appears, based on the date expression form, and generating time-series data for each of the clusters by sorting the items for each of the clusters in order of time, based on date expressions corresponding to the items.

Figure 1:
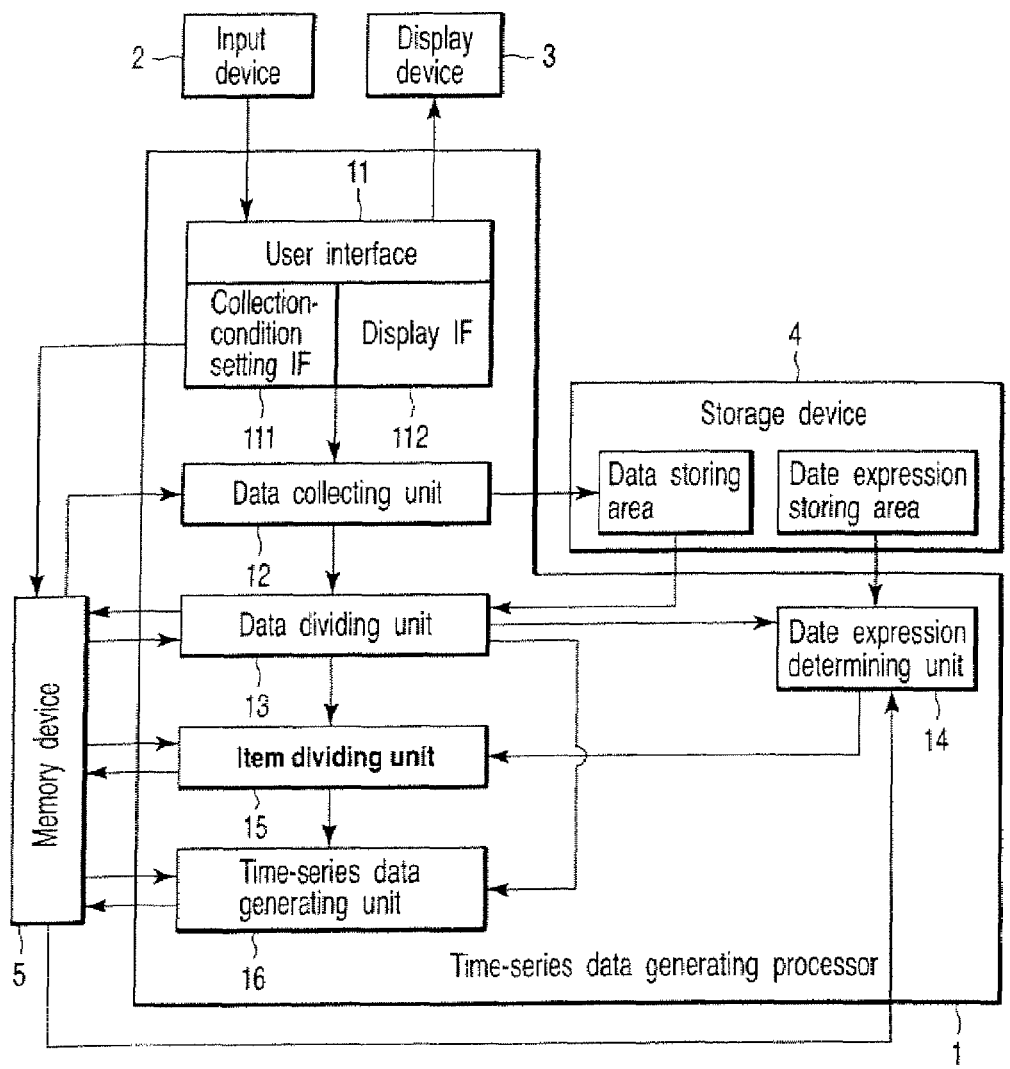
FIG. 1 is an exemplary block diagram showing a configuration of a time-series data generating apparatus according to an embodiment of the invention.

FIG. 1 is a block diagram showing a configuration of a time-series data generating apparatus according to the embodiment of the invention. The time-series data generating apparatus chiefly comprises a time-series data generating processor 1, an input device 2, a display device 3, a storage device 4 and a memory device 5. The time-series data generating processor 1 includes a user interface 11, a data collecting unit 12, a data dividing unit 13, a date expression determining unit 14, an item dividing unit 15 and a time-series data generating unit 16.

The user interface 11 includes a collection-condition setting interface (collection-condition setting IF) 111 and a display interface (display IF) 112. The collection-condition setting IF 111 receives a user's designated collection condition. The collection condition represents a condition for collecting Web pages. For example, a keyword designated by a user and representing a topic in which the user is interested is used as a collection condition. The topic (keyword) is input to the collection-condition setting IF 111 (user interface 11) by a user's operation of the input device 2. The collection-condition setting IF 111 sets the designated collection condition in a given area of the memory device 5. The display IF 112 displays a collection-condition setting screen, time-series data, etc. on the display device 3. The collection-condition setting screen is used to prompt a user to input a topic as a collection condition. The time-series data is generated by the time-series data generating unit 16.

The data collecting unit 12 collects Web pages, which match the collection condition set in the memory device 5 by the IF 111, from, e.g., a plurality of Web sites. The collected Web pages are stored in a data storing area 41 (described later) in the storage device 4. The data dividing unit 13 divides a set of Web pages stored in the data storing area 41 into a plurality of clusters. This division is performed on the basis of uniform resource locator (URL) information of each of the Web pages and information about the expressions shown in each of the Web pages. As is known, the URL information represents the location of a Web page.

The date expression determining unit 14 extracts a date expression from each of Web pages included in each of the clusters obtained by the data dividing unit 13. The date expression conforms to any one of date expressions of predetermined forms (date expression forms). Information about the date expression forms (date expression form information) is stored in advance in a date expression storing area 42 (described later) in the storage device 4. The date expression determining unit 14 determines the most appropriate date expression form for each of the clusters on the basis of the date expression extracted from each of the clusters. The determining unit 14 determines the date expression form as a typical date expression form in a cluster corresponding to the date expression form. In the present embodiment, the date expression includes a year, a month and a day.

On the basis of the typical date expression form determined for each cluster by the date expression determining unit 14, the item dividing unit 15 divides each of the Web pages included in the cluster into a plurality of items. The time-series data generating unit 16 sorts the items for each cluster in order of time to generate time-series data. In other words, the unit 16 generates time-series data whose items are sorted for each of the clusters in order of time.

The input device 2 is used to input various data items, instructions and the like by user's operations. The input device 2 includes a keyboard and a mouse. The display device 3 is, for example, a liquid crystal display for displaying a collection-condition setting screen, time-series data and the like. The storage device 4 is, for example, a magnetic disk drive for storing Web pages and date expression form information. The data storing area 41 and the date expression storing area 42 are secured in the storing area of the storage device 4. The data storing area 41 stores the Web pages collected by the data collection unit 12. The date expression storing area 42 stores the date expression form information in advance. The memory device 5 is configured by a RAM or the like and used as a work area for the time-series data generating processor 1.

Assume in the present embodiment that the time-series data generating apparatus shown in FIG. 1 is implemented using an information processing apparatus such as a personal computer. The user interface 11, data collecting unit 12, data dividing unit 13, date expression determining unit 14 and item dividing unit 15, which are included in the time-series data generating processor 1, are implemented when the processor 1 executes a special program for generating time-series data from Web pages, which is stored in the storage device 4. However, the user interface 11 and the units 12 to 15 can be implemented using hardware such as a programmable logic array (PLA).

Figure 2:
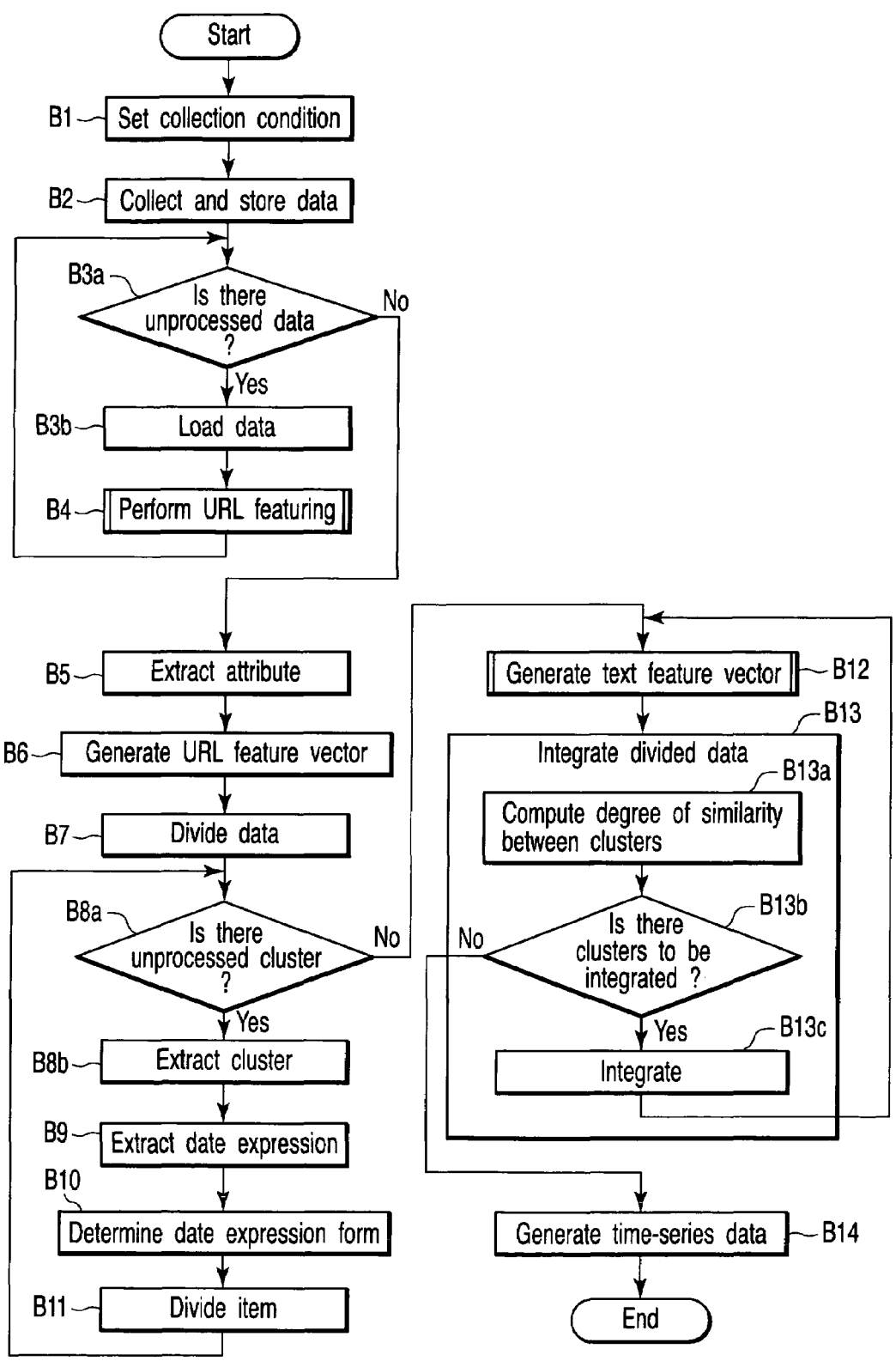
FIG. 2 is an exemplary flowchart of a procedure for generating time-series data by the time-series data generating apparatus according to the embodiment.
Figure 4:
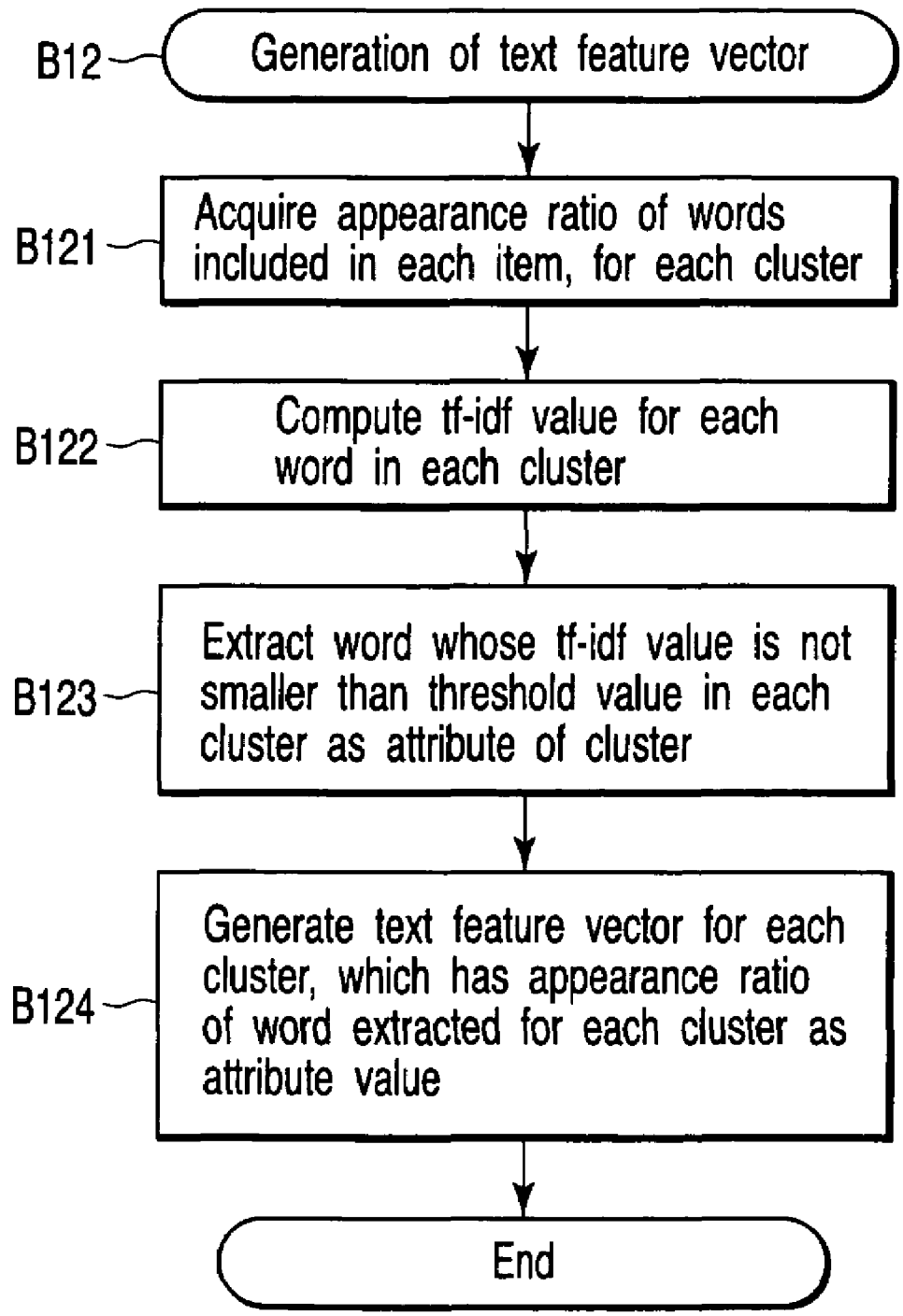
FIG. 4 is an exemplary flowchart of a procedure performed in block B12 in the flowchart shown in FIG. 2.

An operation of the time-series data generating apparatus shown in FIG. 1 will be described with reference to the flowcharts shown in FIGS. 2 to 4. Assume now that a user requires time-series data generated from Web pages associated with a topic in which the user is interested. The user operates the input device 2 and causes the display IF 112 of the user interface 11 to display a collection-condition setting screen on the display device 3. This screen includes an input field capable of inputting keywords as collection conditions of Web pages. The user inputs a plurality of keywords representing a topic in which the user is interested to the input field on the screen using the input device 2.

The collection-condition setting IF 111 of the user interface 11 sets the keywords, which are input by the user using the input device 2, in a given area of the memory device 5 as collection conditions of the Web pages (block B1). The IF 111 notifies the data collecting unit 12 that the collection conditions are set.

Thus, the data collecting unit 12 notifies a search engine (search server) on a network of the collection conditions (keywords) set in the given area of the memory device 5. The search engine collects the Web pages associated with the keywords from, e.g., the bulletin boards of a plurality of Web sites and returns them to the data collecting unit 12. In other words, the data collecting unit 12 collects the Web pages associated with the set keywords using a search engine (block B2). In block B2, the unit 12 stores all of the collected Web pages in the data storing area 41. Assume here that the data collecting unit 12 assigns identification information (ID information) to the Web pages stored in the data storing area 41.

A plurality of search engines can be used to collect the Web pages associated with the set keywords. To do so, the collection-condition setting IF 111 has only to display a collection-condition setting screen on the input device 2 for each of the search engines and prompt a user to set keywords for each of the search engines. In this case, the data collecting unit 12 can notify each search engine of the keywords set for the search engine to collect Web pages for each search engine. Referring to the URL information of the collected Web pages, the data collecting unit 12 can detect Web pages of the same URL information and delete redundant Web pages therefrom.

When the Web pages collected from the Web sites by the data collecting unit 12 are stored in the data storing area, the data dividing unit 13 loads one unprocessed Web page into the memory device 5 from the data storing area 41 (blocks B3a and B3b). The Web page loaded into the memory device 5 is accompanied by URL information. The data dividing unit 13 refers to the URL information and features the Web page on the basis of the URL information (referred to as URL featuring hereinafter) (block B4).

Figures 5, 6:
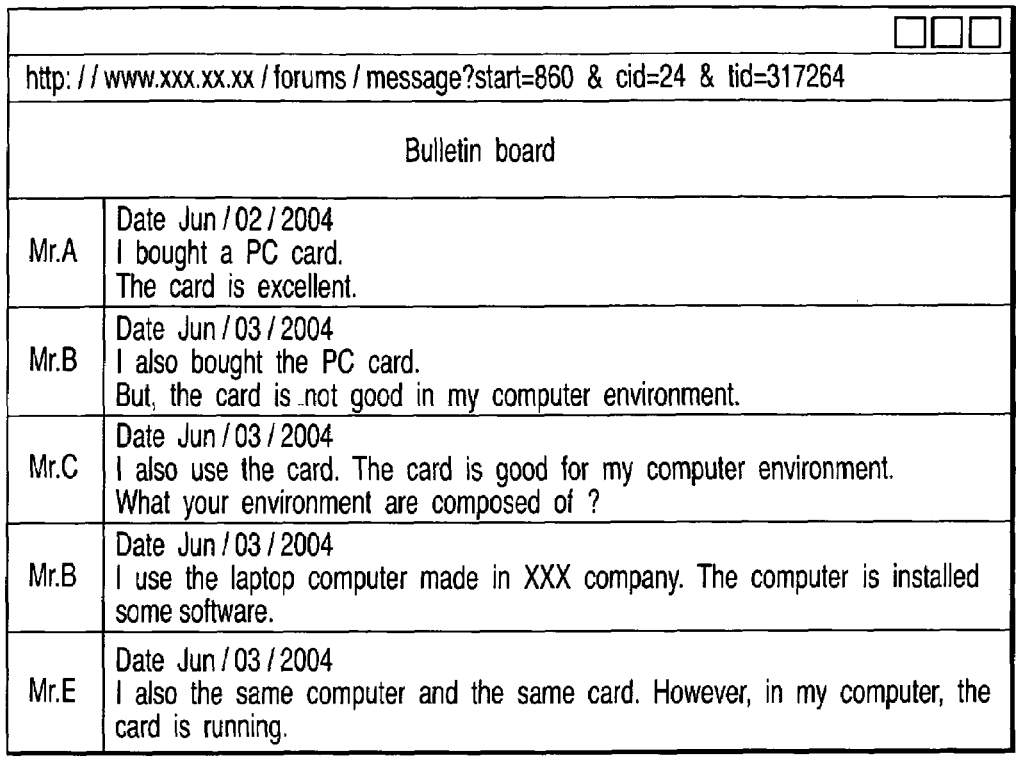
FIG. 5 is a diagram showing an example of one Web page collected by the time-series data generating apparatus according to the embodiment.
FIG. 6 is a diagram showing an example of divided URL information according to the embodiment.

The process (URL featuring) performed in block B4 will be described in detail with reference to the flowchart of FIG. 3 and the diagram of FIG. 5. FIG. 5 shows an example of Web page t1 loaded from the data storing area 41 in block B3b. Assume here that the following URL information is assigned to Web page t1 shown in FIG. 5:

http://www.xxx.xx.com/forums/
  message?start=860&cid=24&tid=317264

When the data dividing unit 13 loads the Web page t1 shown in FIG. 5 into the memory device 5, it divides (decomposes) the URL information assigned to the Web page t1 (block B41). The Web page t1 is divided by predetermined delimiters (first delimiters) "/", "?" and "&". Thus, the data dividing unit 13 extracts character strings (divided character strings) delimited from the URL information by the delimiters. FIG. 6 shows the extracted (divided) character strings.

If the divided character strings include a character string having a sign (equal sign) "=" (block B42), the data dividing unit 13 divides the character string again using the sign "=" as a delimiter (second delimiter) (block B43). In FIG. 6, two character strings "start" and "860" are extracted from character string "start=860". Similarly, "cid" and "24" are extracted from "cid=24" and "tid" and "317264" are extracted from "tid=317264".

Regarding the character strings (not including "=") extracted by the first division, the data dividing unit 13 determines them as attributes and determines the presence or absence of the character strings as an attribute value (block B44). Regarding the character strings extracted by the second division, the data dividing unit 13 determines a part (character string) precedent to "=" as an attribute and determines a part (character string) subsequent thereto as an attribute value (block B45). A URL feature composed of a set of attributes and attribute values is extracted from the character strings shown in FIG. 6. FIG. 7 shows the extracted URL feature. It can be said that the URL feature extracted from the URL information reflects the feature of the Web page t1 to which the URL information is assigned. Extracting the URL feature from the URL information assigned to the Web page is therefore equivalent to assigning the extracted URL feature to the Web page. The URL feature assigned to the Web page is referred to as the URL feature of the Web page.

The data dividing unit 13 continues to perform the above-described URL featuring (block B4) until all the Web pages stored in the data storing area 41 are completely processed (block B3a). In other words, the unit 13 performs the URL featuring for all the Web pages stored in the data storing area 41.

The attributes included in the URL features obtained by performing the URL featuring for all the Web pages stored in the data storing area 41 do not always coincide with each other. A feature vector, which is referred to as a URL feature vector having attributes common to the Web pages as elements, is applied to the present embodiment in order to represent the URL feature of each of the Web pages. The attributes common to the Web pages does not always mean that the URL information of the Web pages has effective attribute values of the attributes.

The data dividing unit 13 performs the URL featuring (block B4) for all the Web pages stored in the data storing area 41 (block B3a), it goes to block B5. In block B5, the data dividing unit 13 extracts attributes common to the Web pages, which are to be elements of the URL feature vector for each of the Web pages, from the result (URL feature) of URL featuring for each of the Web pages stored in the data storing area 41. The above attributes are extracted as follows. First, the data dividing unit 13 merges the attributes and attribute values included in the results (URL features) obtained by performing the URL featuring for the Web pages. The unit 13 extracts all the attributes from the merger without any redundancy. The extracted attributes are elements of the URL feature vector of each of the Web pages.

When the data dividing unit 13 extracts all of the attributes (block B5), it generates a URL feature vector for each of the Web pages (block B6). This URL feature vector is generated as follows on the basis of all of the extracted attributes and the attributes and attribute values included in the results (URL features) obtained by the URL featuring for the Web pages.

First, when the URL feature of a target Web page has the same attribute as that of the URL feature vector of the Web page, the data dividing unit 13 sets the attribute value of the attribute of the URL feature as an attribute value of the attribute of the URL feature vector. On the other hand, when the URL feature of a target Web page does not have the same attribute as that of the URL feature vector of the Web page, the data dividing unit 13 determines an attribute value of the attribute of the URL feature vector according to the type of the attribute. In other words, the data dividing unit 13 determines the attribute values of attributes that compose the URL feature vector as follows, according to whether only one attribute value (the former) or a plurality of attribute values (the latter) are given to the attributes (features) extracted in correspondence with another Web page.

In the former, the data dividing unit 13 determines the attribute values of attributes that compose a URL feature vector of a target Web page as "absence". In the latter, the unit 13 determines the attribute values of attributes that compose a URL feature vector of a target Web page as "–". The sign "–" is a special character string that represents no data.

FIGS. 8 and 9 show examples of URL features of Web pages t2 and t3, respectively, and FIG. 10 shows examples of feature vectors of Web pages t1, t2 and t3. Assume now that the Web pages t1, t2 and t3 are provided with the URL features shown in FIGS. 7, 8 and 9, respectively. With the generation of the feature vector (block B6) described above, feature vectors 81, 82 and 83 are generated as those given to the Web pages t1, t2 and t3 as shown in FIG. 10.

The data dividing unit 13 generates URL feature vectors that are given to the collected Web pages and then goes to block B7. In block B7, the unit 13 uses the URL feature vectors to divide the web pages into a designated number (K) of clusters (clustering) (block B7). The Web pages provided with similar URL feature vectors are classified into the same cluster. In the present embodiment, the K-means method described in, for example, "Fuzzy and Soft Computing Handbook," Japan Society for Fuzzy Theory and Intelligent Informatics, Kyoritsu Shuppan (in Japanese), 2000, pp 161-162 is used for the data division in block B7. In the present embodiment, however, a given distance is defined in advance between attribute values in consideration of the case where an attribute value is a character string or a special sign "–" that represents no attribute. Assume here that an attribute has an attribute value or does not have an attribute value. If both of the attributes of two data items (URL feature vectors) have an attribute value or neither of them has an attribute value, the distance between the data items is defined as "0". If one of the attributes has an attribute value, and the other does not have an attribute value, the distance is defined as "1". The distance between the attribute value "–" and another attribute value is defined as "∞", and the distance between two attribute values "–" and "–" is defined as "0". The results (K clusters) of data division in block B6 are stored in the memory device 5.

When the data dividing unit 13 executes block B7, it extracts one unprocessed cluster from the results (K clusters) stored in the memory device 5 (blocks B8a and B8b). The cluster extracted by the data dividing unit 13 is transmitted to the date expression determining unit 14 and item dividing unit 15 through the memory device 5.

The date expression determining unit 14 executes the following block B9 on the basis of the cluster transmitted from the data dividing unit 13. First, the date expression determining unit 14 analyzes text information of the Web pages included in the cluster. With this analysis, the unit 14 extracts from the text information of the Web pages an expression that coincides with any one of a plurality of date expression forms indicated by date expression form information stored in the date expression storing area 42 (block B9). For the sake of brevity, the phrase "a plurality of date expression forms indicated by date expression form information stored in the date expression storing area 42" is simply referred to as "a plurality of date expression forms stored in the date expression storing area 42."

FIG. 11 shows three date expression forms d1, d2 and d3. Assume here that the date expression storing area 42 stores date expression form information representing the date expression forms d1, d2 and d3. In FIG. 11, the date expression form d1 represents a date in the following order: a year, a month, and a day, where the year is indicated by the Christian era with a four-digit number, the month is indicated by a two-digit number, and the day is indicated by a two-digit number. The date expression form d2 represents a date in the following order: a month, a day, and a year, where the month is indicated by the English three-letter abbreviation, the day is indicated by a two-digit number, and the year is indicated by the Christian era with a four-digit number. The date expression form d3 represents a date in the following order: a month, a day, and a year, where the month is indicated by a two-digit number, the day is indicated by a two-digit number, and the year is indicated by the Christian era with a four-digit number.

Assume here that the Web page t1 shown in FIG. 5 is included in a cluster from which the date expression determining unit 14 extracts a date expression. In the present embodiment, the date expression determining unit 14 extracts five expressions corresponding to the date expression form d2, such as "Jun. 02, 2004", "Jun. 03, 2004", "Jun. 03, 2004", "Jun. 03, 2004" and "Jun. 03, 2004", from the Web page t1. No expressions corresponding to the date expression forms d1 and d3 are extracted.

The date expression determining unit 14 executes the above block B9 for all of the Web pages included in a cluster obtained by the data dividing unit 13. In block B9, the unit 14 counts the number of expressions extracted for each of the date expression forms. In other words, the unit 14 acquires the number of expressions for each of the date expression forms extracted from all of the Web pages included in one cluster.

The date expression determining unit 14 compares the numbers of expressions acquired from one cluster in block B9 and determines a date expression form with the largest number of expressions as a typical date expression form of the cluster (block B10). It is thus possible to prevent the form of date expressions included in the article of a Web page from being determined as a date expression form. Assume here that the number of expressions of date expression form d2 is the largest among the date expression forms acquired from the cluster including the Web page t1 shown in FIG. 5. The date expression determining unit 14 determines the date expression form d2 as a typical date expression form of the cluster including the Web page t1.

The item dividing unit 15 is notified of the date expression form determined by the date expression determining unit 14. The unit 15 divides the Web pages included in the cluster obtained by the data dividing unit 13 into a plurality of items (articles) with reference to a location in which the date expression form determined by the unit 14 occurs (block B11). The unit 14 assigns a date, which corresponds to the expression of the date expression form determined by the unit 14, to each of the items (articles). Five expressions corresponding to the date expression form d2, such as "Jun. 02, 2004", "Jun. 03, 2004", "Jun. 03, 2004", "Jun. 03, 2004" and "Jun. 03, 2004", are extracted from the page t1 shown in FIG. 5. The Web page t1 shown in FIG. 5 is divided with reference to the five expressions. FIG. 12 shows the Web page t1 that is divided with reference to the five expressions. Referring to FIG. 12, the item dividing unit 15 divides the Web page t1 into items i1 to i5. The results of the item division are stored in the memory device 5.

If the foregoing blocks B9, B10 and B11 are executed for K clusters corresponding to all the results of data division to process all of the clusters (block B8a), the data dividing unit 13 goes to block B12. In block B12, the unit 13 generates a text feature vector for each of the clusters on the basis of the results of the item division stored in the memory device 5. The text feature vector represents the feature of text information of the Web pages included in each of the clusters.

A process of generating a text feature vector in block B12 will be described in detail with reference to the flowchart shown in FIG. 4. First, the data dividing unit 13 acquires the appearance ratio of words included in each of items obtained by the item dividing unit 15 for each of the clusters (block B121). The appearance ratio of words included in each item is acquired by analyzing a text included in the item. Then, the data dividing unit 13 uses the acquired appearance ratio and the number of words included in the item to compute a tf-idf value for each of the words of the cluster (block B122). The tf-idf value is described in Shigeaki Sakurai and Yoshimi Saito, "Text Classification Method Using a Named Entity Extractor," Proceedings of the SCI & ISIS 2004, TUE-3-4 (2004). The tf-idf value is an evaluated value indicating the degree to which a notable word appears in a notable cluster (corresponding to a document in the above literature). The lower the degree to which a notable word appears only in a notable cluster, the smaller the tf-idf value. The tf-idf value can thus prevent the evaluated value of an unimportant English word such as "the", whose tf value (appearance ratio of words) is large all over the clusters, from increasing.

The data dividing unit 13 extracts a word (expression) whose tf-idf value is not smaller than a given threshold value as an attribute that features the cluster, on the basis of the tf-idf value computed for each of words in each of the clusters (block B123). The data dividing unit 13 generates a text feature vector for each cluster (block B124). The text feature vector has the appearance ratio of a word extracted for each cluster as an attribute value.

FIG. 13 shows an example of a tf-idf value of each of words included in cluster c1. FIG. 14 shows an example of an appearance ratio (frequency of appearance) for each of the words included in cluster c1. FIG. 15 shows an example of text feature vectors generated for each of clusters c1, c2 and c3 (first, second and third clusters). Assume now that a tf-idf value is computed for each of the words included in cluster c1 as shown in FIG. 13 and the threshold value of the tf-idf value is 0.1. Also assume that the words are extracted from the items included in cluster c1 at the appearance ratio shown in FIG. 14. The data dividing unit 13 compares the tf-idf value of each of the words extracted from the items of cluster c1 with the threshold value, and extracts the words whose appearance ratios are higher than "glad" as those featuring the cluster c1. Consequently, text feature vectors as indicated in the row of c1 in FIG. 15 are generated for the cluster c1.

When the data dividing unit 13 generates text feature vectors for each of the clusters (block B12), it goes to block B13. In block B12, the data dividing unit 13 integrates the clusters (obtained by the unit 13 in block B7) using the text feature vectors of each of the clusters (divided-data integrating process).

The divided-data integrating process in block B13 will now be described in detail. First, the data dividing unit 13 computes the degree of similarity between the clusters on the basis of the text feature vectors of the clusters (block B13a). When the degree of similarity is higher than a given threshold value (block B13b), the data dividing unit 13 determines that the clusters concerned are similar to each other and can be integrated together. The unit 13 integrates these similar clusters (divided data) into a new cluster (divided data) in the memory device 5 (block B13c).

When the data dividing unit 13 generates the new cluster (block B13), it generates text feature vectors for the new cluster (block B12). In other words, the unit 13 recomputes the appearance ratio (frequency of appearance) of each of words used as the feature of the new cluster and generates text feature vectors of the new cluster on the basis of the appearance ratio. The unit 13 repeats the processes of blocks B12 and B13 (integration of clusters) until the clusters with the degree of similarity, which is not lower than a given threshold value, are completely integrated (block B13b). Finally, clusters with a low degree of similarity are generated in the memory device 5.

Assume that the clusters c1 to c3 have their respective text feature vectors as indicated in the rows of c1 to c3 in FIG. 15. Also assume that the degree of similarity between the clusters is defined by "1—(distance between text feature vectors)" and the degree of similarity between clusters c1 and c3 is higher than the threshold value. The data dividing unit 13 integrates the clusters c1 and c3 into a new cluster c4 and generates text feature vectors for the cluster c4. FIG. 16 shows text feature vectors for each of the clusters after the cluster c4 is generated. Referring to FIG. 16, the text feature vectors indicated in the row of c4 are provided for the cluster c4 and the feature vectors indicated in the row of c2 are provided for the cluster c2. If the degree of similarity between the text feature vectors of the clusters C4 and C2 is lower than the threshold value, no clusters are integrated any more. Accordingly, the cluster integration is completed.

Completing the cluster integration (divided-data integration), the data dividing unit 13 requests the time-series data generating unit 16 to generate time-series data. Thus, the unit 16 sorts the items for each of the clusters in order of time according to the clusters finally generated in the memory device 5, and generates time-series data corresponding to the clusters (block B14).

The above time-series data includes topics whose degrees of similarity are high and in which a user is interested. In the present embodiment, the Web pages associated with topics which a user collects from a plurality of Web sites using a search engine and in which the user is interested, are integrated into time-series data on the basis of the progression of the topics over time and the degree of association of the contents of the topics. The Web pages can thus be sorted in consideration of a lapse of time. The user can pick up a topic that interests the user from among the pages of an indefinite number of bulletin boards on the Web to follow the progression of the topic and collect its associated topics. In other words, the time-series data can assist the user in confirming the importance of the topic. If the above time-series data is used, a characteristic time-series pattern as described in Shigeaki Sakurai and Ken Ueno, "Analysis of Daily Business Reports Based on Sequential Text Mining Method," Proceedings of the SMC2004, 3279-3284 (2004), can be detected. If the time-series data is applied to the detected time-series pattern, a direction in which a topic advances can be predicted and a plan for taking measures to prevent a topic from advancing in an undesired direction can be drawn up.

In the foregoing embodiment, the data dividing unit 13 uses "/", "?", "&" and "=" as predetermined delimiters. However, other delimiters such as "." and "," can be used to divide a URL. For two-step division, for example, "/" and "&" can be used as the first delimiter and "?" and "=" can be used as the second delimiter. In place of the date expressions (a year, a month, a day), an expression (date-and-time expression) formed by adding a time expression (time, minute, second) to each of the date expressions can be applied. In other words, a date-and-time expression unit can be used in place of the date expression determining unit 14 to extract an expression regarding date and time from Web pages. In the foregoing embodiment, the data dividing unit 13 features the clusters by texts using all of the items. However, an item can be extracted from the clusters by sampling and a text feature vector can be computed from the extracted item.

While certain embodiments of the inventions have been described, these embodiments have been presented by way of example only, and are not intended to limit the scope of the inventions. Indeed, the novel methods and apparatuses described herein may be embodied in a variety of other forms; furthermore, various omissions, substitutions and changes in the form of the methods and apparatuses described herein may be made without departing from spirit of the inventions. The accompanying claims and their equivalents are intended to cover such forms or modifications as would fall within the scope and spirit of the invention.

What is claimed is:

1. A computer-implemented method of generating time-series data from Web pages, comprising:

collecting Web pages, which match a user's designated collection condition, from a plurality of Web sites, the collecting including storing the collected Web pages in a storage device;

dividing a set of Web pages stored in the storage device into a plurality of clusters, based on URL information of the Web pages;

extracting a date expression from Web pages included in each of the clusters;

determining a typical date expression form for each of the clusters, based on the extracted date expression;

dividing the Web pages included in each of the clusters into a plurality of items with reference to a location where a date expression of the date expression form appears, based on the date expression form;

generating time-series data for each of the clusters by sorting the items for each of the clusters in order of time, based on date expressions corresponding to the items;

providing the Web pages stored in the storage device with URL features, which represent features of URL information of the Web pages, as features of the Web pages, the providing including extracting the URL features by dividing the URL information; and generating feature vectors, which represent the URL features provided for the Web pages, as URL feature vectors, based on the URL features, wherein:

the set of Web pages corresponding to the URL feature vector of each of the Web pages is divided into a plurality of clusters, based on the URL feature vector;

the URL features each include part of URL information from which each of the URL features is extracted, as an attribute;

the URL feature vectors have all attributes of the URL features in common without any, redundancy; and the providing includes:

dividing the URL information into a plurality of divided character strings by a plurality of delimiters; and determining each of the divided character strings as one of an attribute and an attribute value of each of the URL features, the determining including setting each of the divided character strings to one of an attribute having presence or absence of a character string as an attribute value, an attribute having a divided character string subsequent to one of the delimiters as an attribute value, and an attribute value having a divided character string precedent to one of the delimiters as an attribute, in accordance with types of the delimiters, and wherein:

the delimiters are classified into two types of a first delimiter and a second delimiter;

the dividing the URL information includes dividing the URL information into a plurality of divided character strings by the first delimiter, and dividing some of the divided character strings, which include the second delimiter, into a pair of divided character strings by the second delimiter; and the determining each of the divided character strings includes determining the divided character strings, which are obtained by the first delimiter and exclude the second delimiter, as an attribute, determining presence or absence of the character strings as an attribute value of the attribute, determining one of the divided character strings obtained by the second delimiter, which is precedent to the second delimiter, as an attribute, and determining other of the divided character strings, which is subsequent to the second delimiter, as an attribute value.

2. The method according to claim 1, further comprising:

computing a degree of similarity between the clusters, based on text information of Web pages included in the clusters;

integrating clusters whose degrees of similarity exceed a given threshold value into a new cluster; and repeating the computing and the integrating until clusters whose degrees of similarity exceed the given threshold value are completely processed.

3. The method according to claim 2, further comprising:

extracting an expression that features each of the clusters from text information of Web pages included in each of the clusters; and generating a text feature vector that represents a feature of each of the clusters, based on the extracted expression, wherein, in the computing, a degree of similarity between the clusters is computed based on the text feature vector.

4. The method according to claim 3, further comprising acquiring an appearance ratio of an expression included in the items, for each of the clusters, and wherein the text feature vector has the extracted expression as an attribute and the acquired appearance ratio as an attribute value for each of the clusters.

5. The method according to claim 1, wherein the date expression extracted from the Web pages of each of the clusters coincides with any one of a plurality of date expression forms which are predetermined.

6. The method according to claim 1, wherein the date expression is replaced with a date-and-time expression formed by adding a time expression to the date expression.

7. An apparatus that generates time-series data from Web pages, comprising:
- a processor;
- a memory coupled to the processor storing instructions causing the processor to implement the following functionalities;
- a user interface which receives a collection condition from a user;
- a collection unit to collect Web pages, which match the collection condition received by the user interface, from a plurality of Web sites;
- a data storage which stores a set of Web pages collected by the collection unit;
- a data dividing unit to divide the set of Web pages stored in the data storage into a plurality of clusters, based on URL information of the Web pages;
- a determining unit to extract a date expression from Web pages included in each of the clusters and determine a typical date expression form for each of the clusters, based on the extracted date expression;
- an item dividing unit to divide the Web pages included in each of the clusters into a plurality of items with reference to a location where a date expression of the date expression form appears, based on the date expression form determined by the determining unit;
- a time-series data generating unit to generate time-series data for each of the clusters by sorting the items, which are obtained by the item dividing unit, for each of the clusters in order of time, based on date expressions corresponding to the items;
- a providing unit to provide the Web pages stored in the storage device with URL features, which represent features of URL information of the Web pages, as features of the Web pages, the providing unit including an extracting module to extract the URL features by dividing the URL information; and
- a generating unit to generate feature vectors, which represent the URL features provided for the Web pages, as URL feature vectors, based on the URL features, wherein:
the data dividing unit is to divide the set of Web pages corresponding to the URL feature vector of each of the Web pages into a plurality of clusters, based on the URL feature vector;

the URL features each includes part of URL information from which each of the URL features is extracted, as an attribute;
the URL feature vectors have all attributes of the URL features in common without any redundancy; and
the providing unit includes:
- a dividing module to divide the URL information into a plurality of divided character strings by a plurality of delimiters; and
- a determining module to determine each of the divided character strings as one of an attribute and an attribute value of each of the URL features, thereby to set each of the divided character strings to one of an attribute having presence or absence of a character string as an attribute value, an attribute having a divided character string subsequent to one of the delimiters as an attribute value, and an attribute value having a divided character string precedent to one of the delimiters as an attribute, in accordance with types of the delimiters, and wherein:
the delimiters are classified into two types of a first delimiter and a second delimiter;
the dividing module is to divide the URL information into a plurality of divided character strings by the first delimiter, thereby to divide some of the divided character strings, which include the second delimiter, into a pair of divided character strings by the second delimiter; and
the determining module is to determine the divided character strings, which are obtained by the first delimiter and exclude the second delimiter, as an attribute, thereby to determine presence or absence of the character strings as an attribute value of the attribute, the determining module being to determine one of the divided character strings obtained by the second delimiter, which is precedent to the second delimiter, as an attribute, thereby to determine other of the divided character strings, which is subsequent to the second delimiter, as an attribute value.

8. The apparatus according to claim 7, wherein the data dividing unit computes a degree of similarity between the clusters, based on text information of Web pages included in the clusters, and repeats a process of integrating clusters whose degree of similarity exceeds a given threshold value into a new cluster until clusters whose degree of similarity exceeds the given threshold value disappear.

9. The apparatus according to claim 7, further comprising a date expression storage which stores in advance date expression form information representing a plurality of date expression forms, and
wherein the determining unit extracts a date expression which coincides with any one of the date expression forms which are represented by the date expression form information stored in the date expression storage, from the Web pages included in each of the clusters.

10. The apparatus according to claim 7, wherein the date expression is replaced with a date-and-time expression formed by adding a time expression to the date expression.

* * * * *